April 28, 1970     A. G. MIREL     3,508,495
AUTOMATIC VEHICLE-TRANSPORTING SYSTEMS
Filed Aug. 28, 1967     7 Sheets-Sheet 1
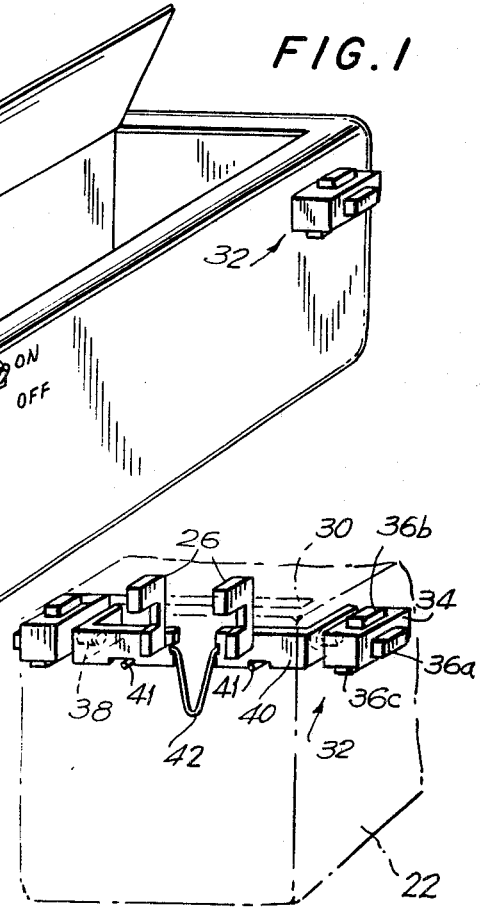
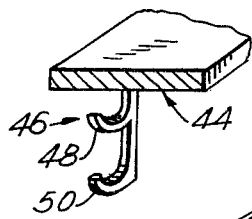
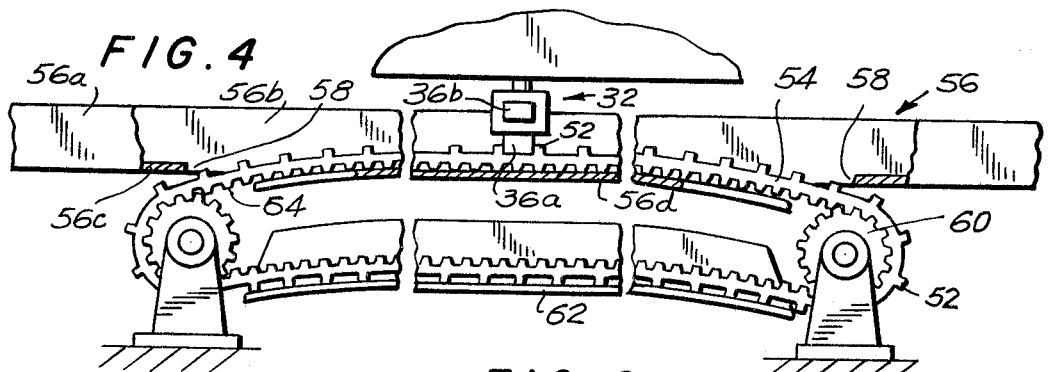
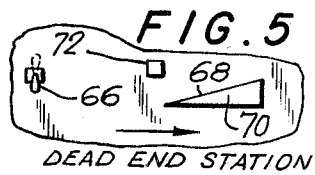
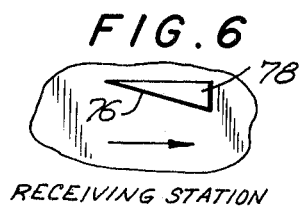
INVENTOR.
ARTHUR G. MIREL
BY Percy Freeman
ATTORNEY April 28, 1970     A. G. MIREL     3,508,495
AUTOMATIC VEHICLE-TRANSPORTING SYSTEMS
Filed Aug. 28, 1967     7 Sheets-Sheet 2
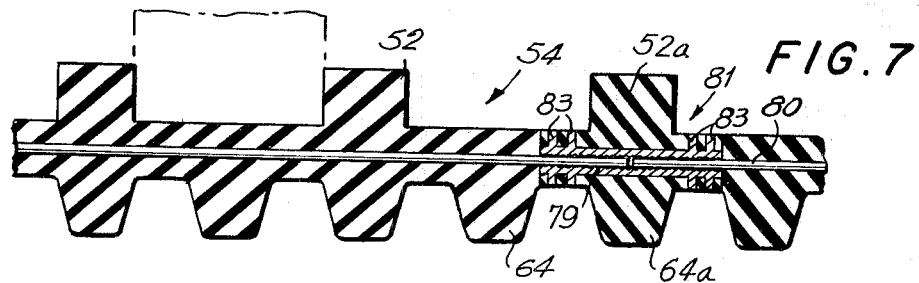
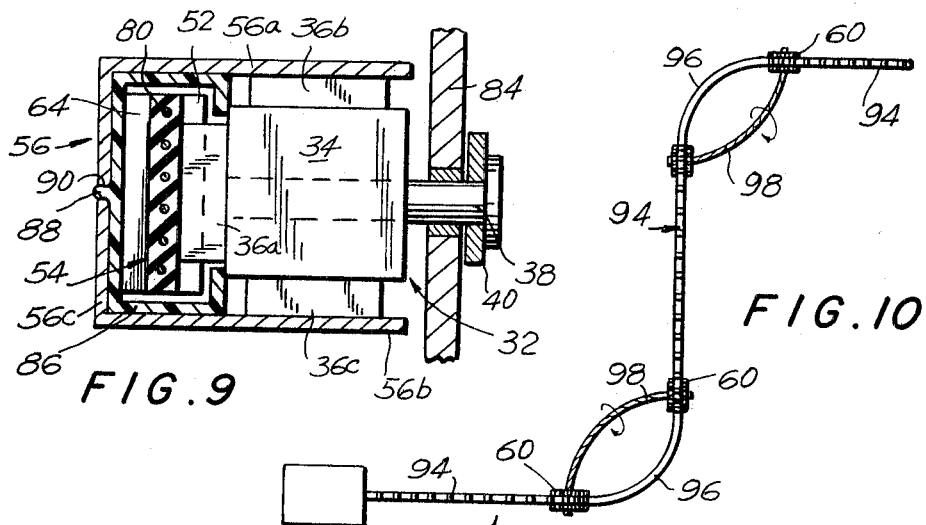
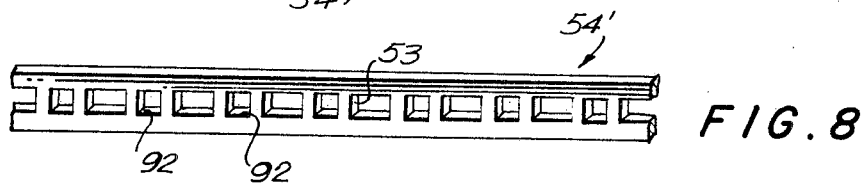
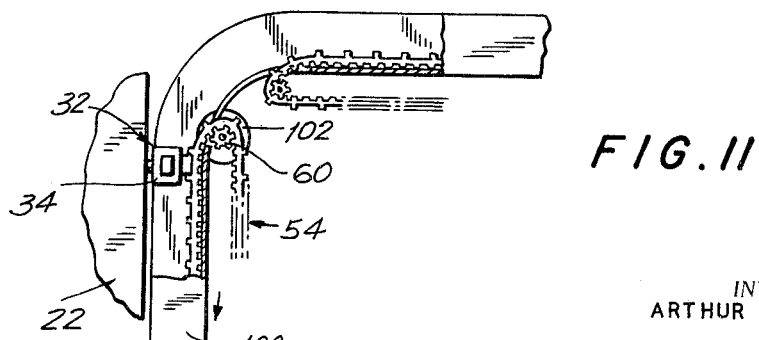
INVENTOR.
ARTHUR G. MIREL
BY Percy Freeman
ATTORNEY INVENTOR.
ARTHUR G. MIREL
BY Percy Freeman
ATTORNEY

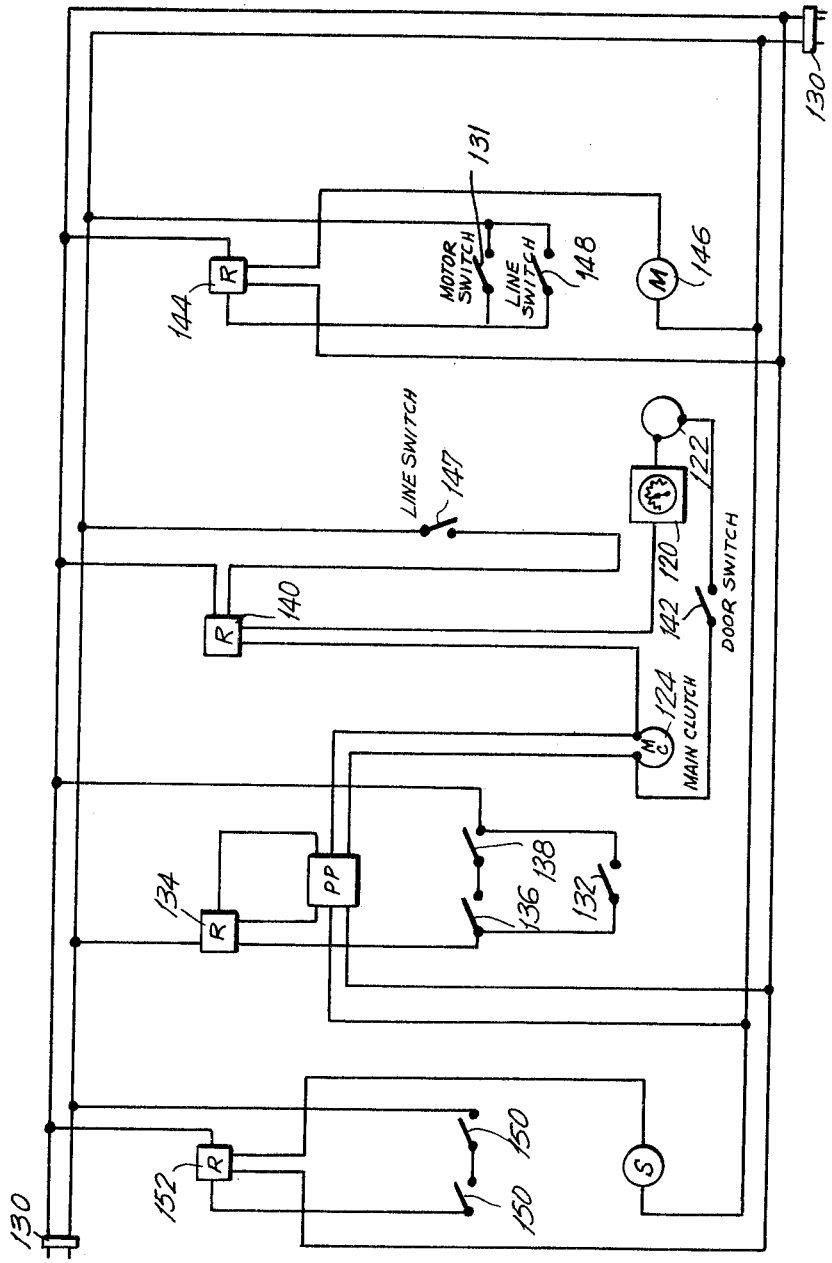

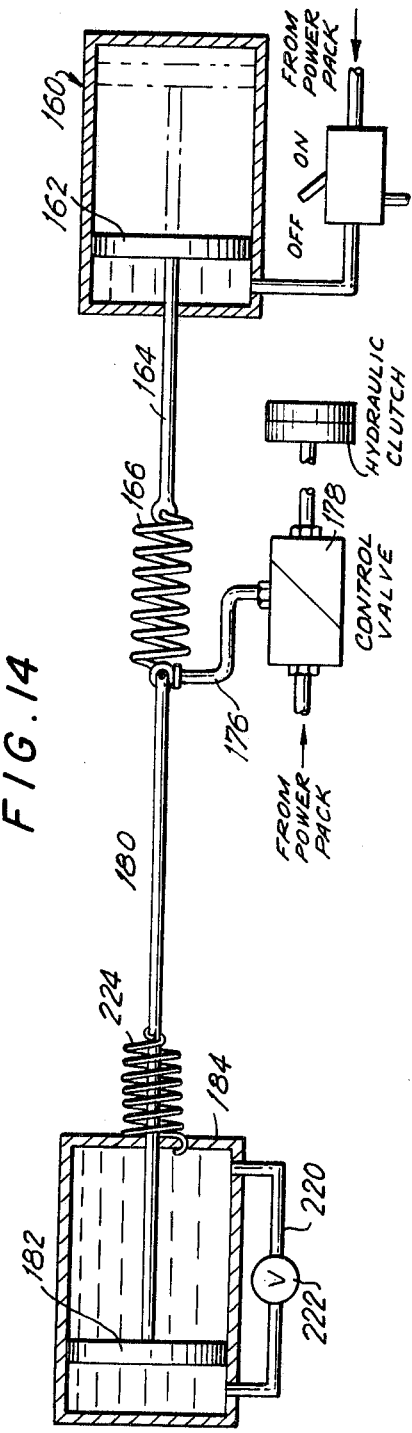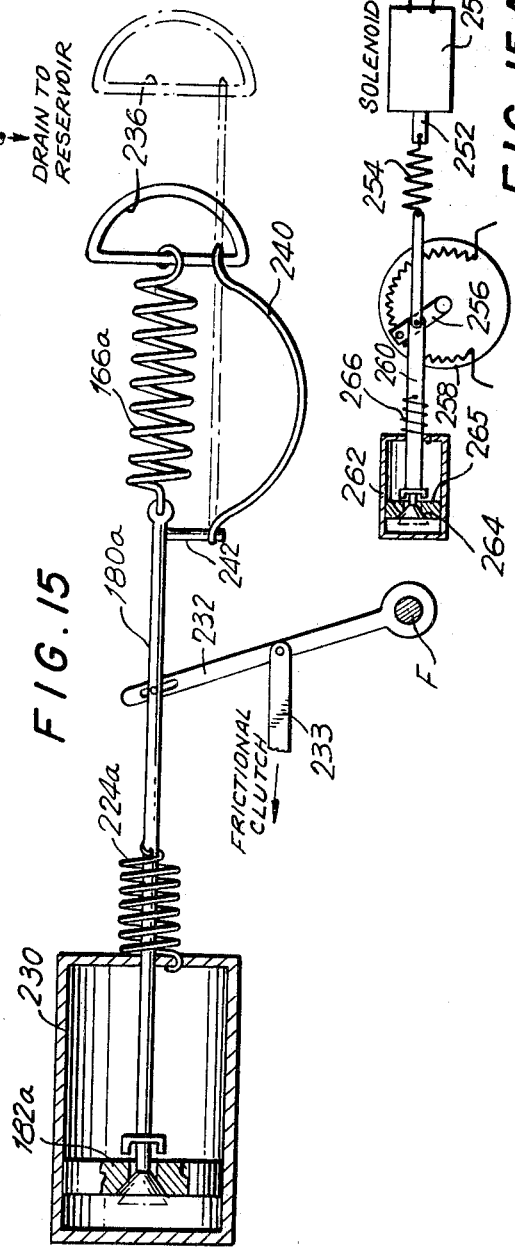

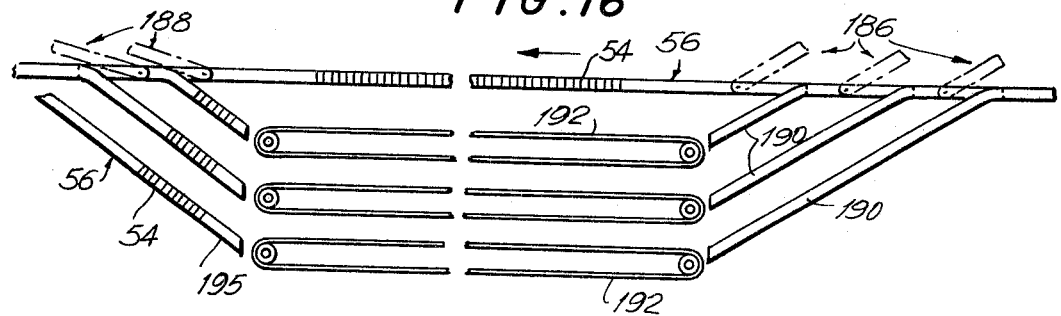
FIG. 16
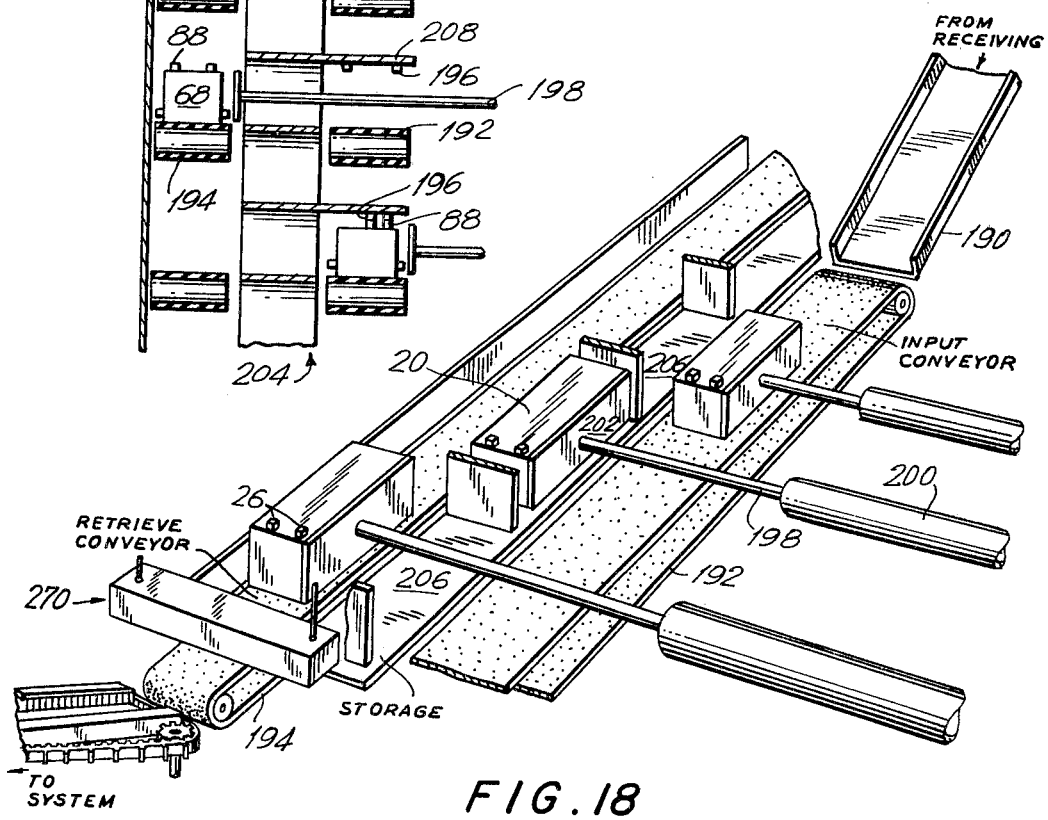
FIG. 17
FIG. 18

April 28, 1970  A. G. MIREL  3,508,495
AUTOMATIC VEHICLE-TRANSPORTING SYSTEMS
Filed Aug. 28, 1967  7 Sheets-Sheet 7
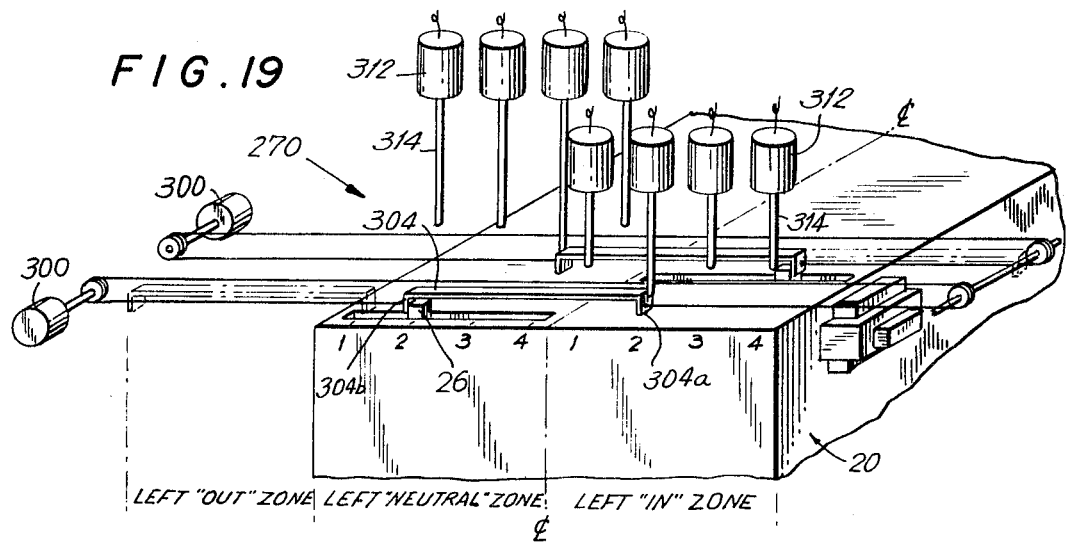
FIG. 19
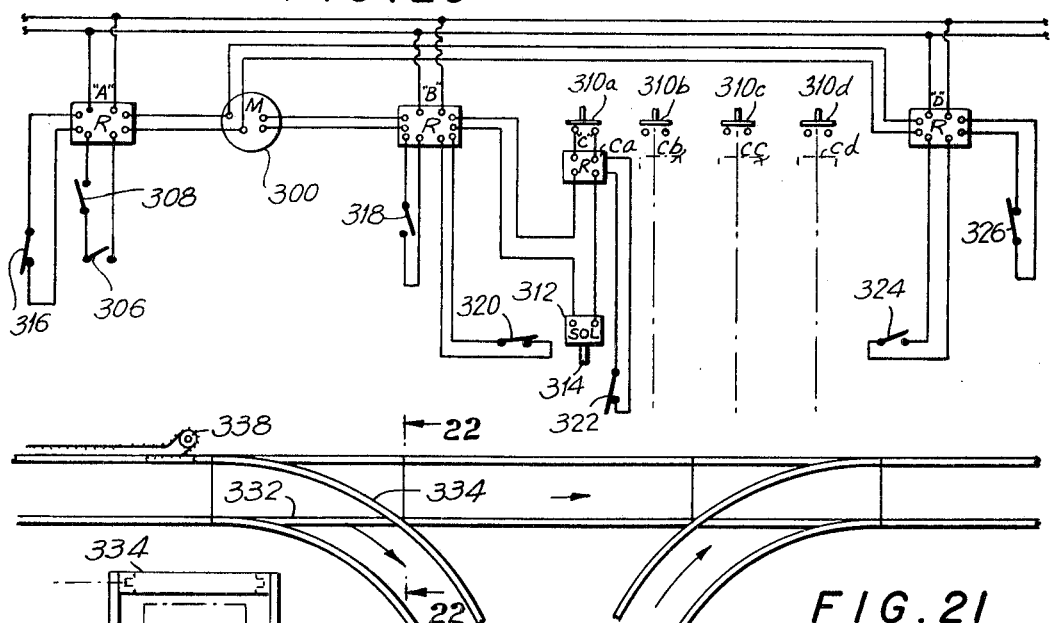
FIG. 20
FIG. 21
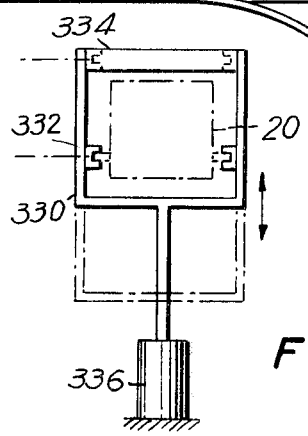
FIG. 22
INVENTOR.
ARTHUR G. MIREL
BY Percy Freeman
ATTORNEY

United States Patent Office 3,508,495
Patented Apr. 28, 1970

3,508,495
AUTOMATIC VEHICLE-TRANSPORTING SYSTEMS
Arthur G. Mirel, Scarsdale, N.Y., assignor to Telecarrier Corporation, White Plains, N.Y., a corporation of New York
Continuation-in-part of application Ser. No. 421,359, Dec. 28, 1964, now Patent No. 3,338,177. This application Aug. 28, 1967, Ser. No. 663,791
Int. Cl. B61b *13/00;* B61j *3/00;* B01k *1/00*
U.S. Cl. 104—88                                         24 Claims

ABSTRACT OF THE DISCLOSURE

An automatic vehicle-transporting system wherein a carrier for the load is provided with glide-pawls which are adapted to slide along a rail means, the configuration of which determines the configuration of a circuit along which the load carrier moves. Each glide-pawl is in the form of a block, at least one side of which slidably engages the rail means and at least one other side of which is advanced by an advancing means. The advancing means takes the form of a plurality of endless belts which have outer projections between which a part of a glide-pawl is received for transmitting movement to the glide-pawl and the carrier to which it is connected. These projections of the belt are situated at the exterior thereof, while the interior side of each belt is driven by a rotary drive means in the form, for example, of a sprocket.

An ingress means is provided for introducing a carrier into the circuit of the system, and at this ingress means there may be fluid-actuated means for sensing the load carried by the carrier and for providing for substantially uniform acceleration of the carriers irrespective of the loads carried thereby. In addition, there is located at the ingress means a lockout clutch-means which operates automatically to permit entry of a carrier into the system only when the carrier which is introduced will not collide with another carrier which moves along the system.

At a dead-end station located along the system, there are suitable devices to eliminate from the system carriers which do not find their proper receiving stations. Also, when the carrier is required to move vertically in a downward direction along the system, its downward movement is retarded by a slip-clutch and a motor assembly moving at a reduced speed. In addition, when certain articles are to be stored, the system has a storage and retrieval assembly which will store articles until they are to be used, whereupon they can be retrieved.

CROSS REFERENCE TO RELATED APPLICATION

This application is a continuation-in-part of copending application Ser. No. 421,359, filed Dec. 28, 1964, and entitled "Automatic Article-Transporting System" now Patent 3,338,177.

BACKGROUND OF THE INVENTION

The invention relates to systems for transporting load-carriers along a given circuit to a selected one of a number of receiving stations located along the circuit. Although constructions of this general type are known, they are relatively complex and do not operate in the most reliable manner. The speed with which the load carriers of the conventional systems move cannot always be accurately regulated, and with these known systems, various difficulties are encountered, as, for instance, the requirement in the known systems, of a very sophisticated logic system.

SUMMARY OF THE INVENTION

Thus, it is a primary object of the present invention to provide a construction of the above general type, which is simpler and more reliable in its operation than conventional known structures provided for the same purpose.

In particular, it is an object of the present invention to provide an exceedingly simple load carrier capable of coacting through its relatively simple structure not only with a rail along which the carrier moves, but also with an advancing means which advances the carrier along the rail.

In addition, it is an object of the invention to provide a construction which will render the components of the advancing means and the rail means exceedingly simple and highly resistant to wear, and one which will be capable of operating at speeds far in excess of any present components of equivalent nature, and which have a high power efficiency conversion factor.

Furthermore, it is an object of the present invention to provide a construction where carriers which cannot find a suitable receiving station will be automatically eliminated from the system, as at a suitable dead-end station.

Furthermore, it is an object of the present invention to provide a construction which will permit introduction into the system of carriers with different loads at substantially the same speed.

A further object is to provide a construction which may be used to advance load-bearing carriers through a system of successive vertical endless loops in a manner which requires no counterbalancing or long cable structure, and in which vertical travel of the carriers may be integrated with structure capable of diverting the carriers from this vertical attitude to a horizontally disposed system at any one of many preselected levels.

Also, the objects of the present invention include a construction which will control the entry of a carrier into to system in a manner preventing collision between the introduced carrier and a carrier already moving along the system.

Furthermore, it is an object of the present invention to provide for use with such a system, a storage and retrieval assembly enabling carriers with articles therein to be suitably stored until the articles are to be used, whereupon the stored carriers and articles can be automatically retrieved and reintroduced into the system.

BRIEF DESCRIPTION OF THE DRAWINGS

The invention is illustrated by way of example in the accompanying drawings, which form part of this application, and in which:

FIG. 1 is a perspective illustration of one possible embodiment of a load-carrier according to the invention.

FIG. 2 is a fragmentary perspective illustration of a glide-pawl assembly situated at one end of the load-carrier of FIG. 1.

FIG. 3 is a fragmentary perspective illustration of another embodiment of a load-carrier.

FIG. 4 is a fragmentary schematic partly sectional plan view of the manner in which an advancing means and a rail means coact with a glide-pawl to advance a load-carrier.

FIG. 5 is a schematic illustration of part of the structure at a dead end station.

FIG. 6 is a schematic illustration of camming structure situated at each of a number of receiving stations.

FIG. 7 is a longitudinal sectional illustration, on an enlarged scale as compared to FIG. 4, fragmentarily illustrating the structure of the advancing means, and also splicing means for joining together two ends of said advancing means.

FIG. 8 is a fragmentary perspective illustration of another embodiment of an advancing means.

FIG. 9 is a transverse section through the rail means and that part of a carrier which coacts therewith, and showing the details of the rail means and advancing means.

FIG. 10 is a schematic illustration of part of the circuit of the invention and in particular of the arrangement of the advancing means therealong.

FIG. 11 is also a schematic fragmentary elevation of part of the circuit of the invention, and showing in particular, structure at a vertical portion of the rail means for retarding downward movement of a load-carrier along the vertical portion.

FIG. 13 is a block diagram illustrating how components of FIG. 12 are electrically interconnected.

FIG. 14 is a fragmentary sectional schematic illustration of one embodiment of a load-sensing structure which is fluid actuated.

FIG. 15 is a partly sectional schematic illustration of a load-sensing structure which is manually actuated.

FIG. 15A is a partly sectional schematic illustration of an electrical load-sensing structure.

FIG. 16 is a schematic elevation of part of a storage and retrieval system.

FIG. 17 is a transverse section of part of the structure of FIG. 16.

FIG. 18 is a fragmentary perspective illustration of the storage and retrieval system, illustrating how it operates.

FIG. 19 is a schematic perspective view of the automatic carrier dispatcher.

FIG. 20 is a block diagram showing the electric circuitry of the automatic carrier dispatcher.

FIG. 21 is a schematic plan view of a lateral diverting section showing ingress and egress paths for a main system.

FIG. 22 is a typical end view as viewed on line 22—22 of FIG. 21, in the direction of the arrows.

DESCRIPTION OF THE PREFERRED EMBODIMENTS

Figure 12:
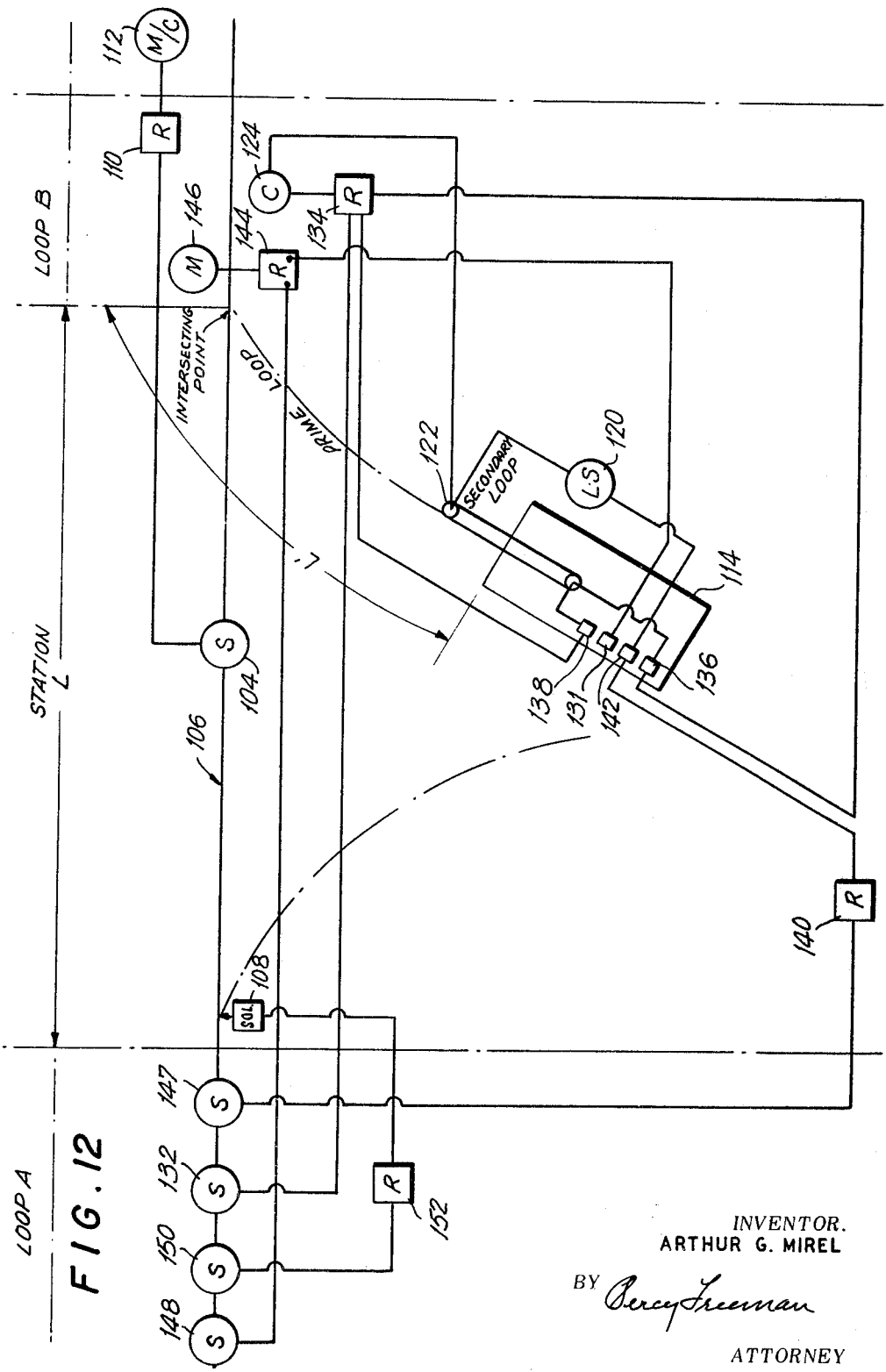
FIG. 12 is a schematic representation of part of a circuit showing the various units situated therealong and in particular, illustrating an ingress means and structure of the invention located at the ingress means.

The structure of the present invention is adapted to be used in a load-transporting system of the type disclosed in application Ser. No. 421,359, filed Dec. 28, 1964, and now U.S. Patent No. 338,177.

As is disclosed in the latter patent, the system includes a circuit along which load-carriers are capable of moving either in one direction or in a pair of opposed directions simultaneously, and the movement is controlled by a logic circuit disclosed in the above patent.

As may be seen from FIG. 1, the particular load-carrier 20 illustrated therein includes a hollow enclosure 22 which may be of any size and of a substantially rectangular configuration, this enclosure having in the illustrated example, a hinged cover 24. However, the load-carrier of the present invention can also be used for carrying personnel, as for example along a circuit of a mine, so that the load-carrier of the invention can also be designed for carrying people as well as articles.

The load-carrier 20 carries at one of its ends a pair of adjustable switch-actuating members 26, which, as disclosed in the above patent, will actuate switches which have been preset to cause the load-carrier to be received at a predetermined receiving station of the system. These switches can be positioned according to the indicia 28 indicated at the end of the carrier 20, which is visible in FIG. 1. As may be seen from FIG. 2, at its end which carries the members 26, the carrier has a slotted guide structure 30, also disclosed in the above patent, for guiding the members 26 so they can be positioned at selected locations.

In accordance with the present invention, the load-carrier 20 is provided in the regions of its corners with glide-pawls 32, each of which includes a block 34 substantially rectangular configuration and a plurality of projections 36a, 36b, and 36c. The projections 36b and 36c extend respectively from upper and lower faces of and are integral with the block 34, while the projection 36a projects from an outer exterior surface of, and is also integral with the block 34, these projections 36a–36c and the block, being made of a suitable relatively rigid material, such as a suitable plastics material, which nevertheless has good sliding properties.

As may be seen from FIG. 2, the blocks are carried by the outer ends of shafts 38 which extend through suitable wall portions of the carrier, as disclosed in the above patent, and these shafts are in turn carried by L-shaped brackets 40 guided for movement in the carrier in the manner disclosed in the above patent, and urged apart from each other by a leaf spring 42 and limited by pins 41. Thus, with this construction, the pawl and slide structures of each glide-pawl 32 are combined into a single simple unit.

As may be seen from FIG. 3, instead of a carrier in the form of a hollow enclosure, it is possible to provide a carrier 44 in the form of a relatively flat member carrying glide-pawl units 32 which are not illustrated in FIG. 3 but which are of the same general construction as those described above and which are mounted in the same way on the carrier 44, which is also provided with the members 26, which will determine the destination of the carrier. In this case, the carrier may be provided with hook structures 46 adapted to support miscellaneous articles, such, for instance, as baggage, etc. This hook structure 46, in the illustrated example, includes a pair of hooks 48 and 50, which are combined into a single unit fastened to the underside of the carrier 44, so that depending upon the structure and load of the article, it can be attached either to the hook 48 or to the hook 50. Obviously, any other type of attaching means may be provided.

The manner in which one or more of the glide-pawls 32 coacts with an advancing means and rail means is illustrated in FIG. 4. Thus, the pawl projection 36a of a given glide-pawl 32 can be received between a pair of successive projections 52 of an elongated flexible, substantially non-stretchable endless belt 54 which forms part of the advancing means. This endless belt 54 carries the projections 52 at its exterior surface to coact with the pawl projection 36a, and one or both of the other projections 36b and 36c slidably engage the rail means 56 in the form of an open channel receiving the glide pawl 32 in its interior with the projections 36b and 36c slidably engaging opposed walls 56a and 56b of the rail means 56 (see FIG. 9). While the glide pawls 32 have been shown and described as including a block 34 with projections 36a, 36b and 36c, is should be understood that such structure is not always necessary and that the projections may be completely eliminated and instead, the block alone may be used, it being of a suitable size and shape to nicely fit between projections 52. This rail means has a third wall 56c interconnecting the walls 56a and 56b and formed with openings 58 through which the belt 54 extends to be guided along the inner surface of the wall 56c between the pair of openings 58 indicated in FIG. 4. The part 56d of the rail 56 which engages the advancing means 54 may be curved as indicated in FIG. 4. This presents a lead and exit angle for the progressive movement of the glide pawls in and out of successive belt sections. The endless belt 54 is guided for movement around sprockets 60 which can be supported for rotary movement as indicated in FIG. 4, and any one of which can be driven, and in FIG. 4, the outer run of the belt 54 is shown as guided by a suitable guiding structure 62. In order to coact with the sprockets 60, the advancing means 54 is provided at its inner surface with teeth 64 which coact with teeth of the sprocket 60.

In the event a load-carrier is not timely received at any receiving station, an electric circuit will sense this occurrence. In order to handle such situation, such circuit includes a dead-end station, part of which is schematically indicated in FIG. 5. In addition, each load carrier carries at an exterior side thereof, a flag 66 similar to the lever of a toggle switch and capable of being displaced between the upper "ON" position and the lower "OFF" position, indicated in FIG. 1, this flag 66 remaining in whichever one of these positions to which it had been deflected. As may be seen from FIG. 5, when the carrier moves for the first time past the dead-end station, and the flag 66 is in its lower "OFF" position, it will ride upwardly along the upper camming surface 68 of a cam 70 located at the dead-end station so that the flag 66 will be displaced upwardly to its "ON" position. Then if the carrier is not received at any particular receiving station, it will move past the dead-end station a second time. At the dead-end station, there is located a control member 72 which will be engaged by the flag 66 if it is in its "ON" position as it moves toward the dead-end station. The control member 72 being situated in advance of the cam 70, will be engaged by the flag 66 when it is in its "ON" position only when the carrier moves for a second time past the dead-end station, as shown in phantom lines on FIG. 5, and when so actuated, it will initiate the operations which will remove the carrier from the system.

On the other hand, if the carrier is properly received at a selected one of a number of receiving stations such as the receiving station 74 diagrammatically indicated in FIG. 6, or if the carrier had been diverted out of the system at the dead-end station, then in either of such events, as the carrier is received in the receiving station, or dead-end station, its flag 66 will be engaged by the lower camming surface 76 of a cam 78 to be restored to its "OFF" position.

Referring now to FIG. 7, it will be seen that the belt 54 which forms the advancing means is made of a suitable plastics material or the like, and has at its exterior surface, the projections 52 which coact with the pawl members 36a of the glide pawls 32. At its inner surface, the belt has the teeth 64 which coact with the sprockets, for example. Embedded in the belt, between its inner and outer faces, is an elongated substantially non-stretchable reinforcement filament 80 made of metal or plastics and substantially preventing stretching of the belts. The belts are formed into loops having long centerline sprocket distances by manufacturing processes or special splicing techniques.

A method of splicing belt sections together to form these long belt loops is illustrated in FIG. 7. A splice section 81 which corresponds precisely with a section of the belt in which it will be inserted includes a tooth 64a and a projection 52a and space sections sufficient to maintain the pitch of the teeth and of the projections to achieve continuity in the belt structure loop. The splice section 81 is provided with a tubular liner within its structure to accept exposed tension filaments from the adjacent ends of belt section to be joined together. These filament ends are either pierced by the inner serrated liner surface or are compressed into the interstices of braided filament material to effect a continuity of belt tensile strength through a crimping action by a suitable crimping tool.

The composition of the splice section material is identical to the parent belt section. The serrated tubular structure is an insert placed within the matrix of the belt splice section and is of a metallic composition which can yield to the compressive force applied as part of a crimping action. It remains in a permanent set condition to insure the life of the splice.

The crimping operation is accomplished by applying a compressive force on studs 83 provided as part of the tubular insert 79 by a tool capable of exerting sufficient force either through mechanical toggle action or fluid actuation, to cause the serrated surfaces to impinge upon the reinforcement filaments which had been exposed and extend from each end of the belt sections to be joined.

The details of the rail means 56 and the manner in which the advancing means 54 and glide-pawls 32 coact therewith are shown most clearly in FIG. 9, wherein there is shown a part of a bracket 40 fixedly carrying the pin 38 which is fixed to the glide pawl 32. This glide pawl 32 has the block 34. The upper projection 36b is shown just beneath the upper wall 56a of the rail 56. The lower projection 36c slidably engages the lower wall 56b of the rail. The pin 38 extends through a wall portion 84 of the carrier 20. The projection 36a is received between a pair of projections 52 at the outer side of the belt 54, one of these projections 52 being visible in FIG. 9. FIG. 9 also shows the reinforcing elements 80 which prevent stretching of the belt and the elongated teeth 64 at the inner side of the belt, which coact with the sprockets.

As may be seen from FIG. 9, the rail means may be provided in its interior with a wear-resistant liner 86 made of Teflon, for example, and having the channel-shaped configuration as illustrated, so that lengths of the liner 86 can be disposed within the channel member which forms the rail 56. In order to be maintained reliably within the rail, the wear-resistant liner 86 is provided with longitudinally spaced, snap projections 88 received in openings 90 formed in the wall 56c, so that in this way the liner sections can be removably snapped into the rail structure.

It will be understood that the advancing means 54' illustrated herein may also take the form of a belt having perforations 53 to coact with the pawl projections 36a of the glide-pawls 32. However, in this case, the belt 54' is provided with perforations or recesses 92 which coact with the teeth of the sprocket wheels so that the belt 54' will be advanced to transmit its driving movement to the glide-pawls 32 of the load-carrier.

Referring to FIG. 10, it will be seen that the circuit of the system, part of which is illustrated in FIG. 10, includes straight portions 94 interconnected by the curved portions 96, these portions being formed by the rail means 56. In accordance with a further feature of the invention, the advancing means 54 may extend only the straight portions 94 and not necessarily along the curved interconnecting portions 96 where the direction of the rail means changes and where straight portions 94 are interconnected. Thus, as may be seen from FIG. 10, the plurality of endless belts which form the advancing means 54 extend only along the straight portions 94 and not along the curved portions 96 of the rail means. These belts are driven by the sprockets 60, any one of which may be driven from a suitable motor (not shown), and in order to transmit the drive from the sprocket 60 at the end of one belt to the sprocket 60 at the end of the next belt, the sprockets, such as those shown at the lower right of FIG. 10, are interconnected by flexible motion-transmitting means 98 which are capable of transmitting rotary movement of one sprocket to the next sprocket, and, of course, this same type of flexible drive may be provided to bridge each of the curved portions 96. Obviously, other motion-transmitting means may be utilized. In this way, it is possible to locate the drive only at the straight portions of the rail means, so that the construction is considerably simplified in this way.

Referring now to FIG. 11, when the load carrier negotiates a curved portion of the rail means, it may arrive at a vertical rail section 100 to move downwardly along the latter, and the glide pawls coact at this part of the structure also with the advancing means 54 of the invention. However, in this case, the sprocket 60 at the upper end of the vertical rail portion is fixed to a slip clutch 102 through which it is driven by a motor situated behind the slip clutch, and operating at a reduced speed, so that as the carrier moves downwardly, it will tend to turn the belt 54 and the sprocket 60 to act through the slip clutch 102 on the motor, thus providing a retardation of the downward movement until there is no longer any slippage of the clutch between the load and the motor. The slipping action of the slip clutch, which runs at a reduced speed at the motor side of the clutch, absorbs the overhauling force imparted by the kinetic energy of the higher velocity carrier. The frictional characteristics of the clutch will reduce the speed of the carrier to match the reduced speed of the motor. Thus, the carrier may be decelerated to a controlled and safe stop. Obviously, the same procedure may be followed when it is required to retard carriers which may be moving along a horizontal or any plane other then vertical. Under conditions of heavy loads, a means is provided to coact with the structural elements described herein. The means provided are in the form of additions of mechanical, fluid or electrical hysteresis devices having the function of dissipating energy out of the system to further control the decelerating characteristics.

Referring now to FIG. 12, part of the system is schematically illustrated therein, and includes components which are representative of the entire system. It will be seen that there are various sensors or switches 104 located along the path of carrier travel to sense the arrival of carriers, to initiate belt loop movement in succeeding loops in advance of the carrier for the purpose of travel continuity. Sensor 104 energizes relay 110 which controls the on-time of a motor 112 located in a motor module. Activation of the succeeding loop is set by the relay to conform to time requirements necessary for the passage of the carrier through this particular loop. At the expiration of this time value, all motion of the loop ceases unless acted upon by a following carrier.

Other sensing switches to be activated in the path of the advancing carrier are used to determine whether or not a particular carrier has arrived at its preselected station 106. A diverter solenoid 108 is located at each station to divert the rails for directing a carrier out of the system into the selected station, as disclosed in the above mentioned patent.

FIG. 12 also shows an ingress means 114 provided with a suitable door through which a carrier can be introduced for movement into the system. At this ingress means are located switches 131, 136, 138, 142 as well as an accumulating holding relay 140 and a load sensor 120 described in greater detail below. In accordance with one feature of the present invention, there is also located at the ingress means 114 a lockout clutch means 122 which coacts with the motor 146 and clutch unit 124 so as to prevent introduction of a new carrier through the distance L' into the system if the hold sensor 147 senses that the carrier which is about to be introduced will collide with a carrier moving along the system from left to right, as viewed in FIG. 12.

Referring now to FIG. 13, one example of an electrical circuit which can be used with the invention, is illustrated therein, this circuit forming part of the logic circuit. FIG. 13 shows the electrical connectors 130 by which one module is electrically connected with the next module. The circuit includes the normally open, "held closed" switches 136 and 142 which, upon opening the door of the ingress means 114 will assume their open position. Thus, switch 136 will break the circuit to the time holding relay 134 and switch 142 will open the circuit to the lockout clutch 122.

As a carrier enters the ingress means, it trips the normally open switches 131 and 138. Switch 131 starts the motor 146 of the motor-and-clutch assembly by energizing relay 144. Switch 138 arms the clutch 124 through the relay 134. However the final energization of this circuit is accomplished only after the closing of the ingress door. The period of operation of this assembly is sufficient to move the inserted carrier out of the ingress means into the system plus a certain cool-down period for the motor before it is started again. The motor is also capable of being started by a switch 148. This switch is in the path of movement of a carrier which moves through the system. Additionally, clutch 124 can be energized by switch 132 through relay 134. It is clear, therefore, that the on-time cycle for the motor-and-clutch assembly can be initiated by a passing carrier through the actuation of switches 132 and 148 or through actuation of the switches at the ingress means.

Upon closing of the door of the ingress means, the switches 136 and 142 simultaneously close their respective circuits. Switch 136 will energize relay 134 and clutch 124. Simultaneously, closing switch 142 will enable clutch 122 to engage the secondary loop to the prime loop sections for the purpose of advancing the carrier out of the ingress means into the system. However, if a carrier is in the system and approaching the station 106, it trips switch 147 which activates time delay relay 140. The time value of this relay is set to provide sufficient time for the passing carrier in the system to clear the intersecting point indicated in FIG. 12, and thus locking out the lockout clutch for a sufficient period of time. Under normal conditions, when no carrier is passing through the system, the time delay relay 134 activates the main clutch 124 and lockout clutch 122 for a set time value imparted to these components which is determined by the time necessary for a carrier to leave the ingress means at its entrance end and to arrive at the point of intersection indicated in FIG. 12. This arrival should take place earlier than that of a carrier advancing to the same point of intersection through the distance L along the system where the hold sensor 147 is located. This hold sensor is in the form of a normally open switch located in line of carrier travel.

As the carrier advances through the system, it trips sensors 104 to provide power in the succeeding loop. The passage of a carrier in a loop trips switch 104 to close a motor and clutch circuit through holding relays 110 to provide sufficient on-time in the succeeding loop for the advancing carrier into and through the succeeding loop. After the lapsed time this circuit is deenergized until again activated by the next carrier.

FIG. 13 shows the switches 150 which identify a particular station and which are actuated by a pair of members 26, these switches being connected in series with one of the several cumulative time holding relays 152 which can only be energized when both of the switches 150 are closed, and in this way the diverting of a carrier from the system will be carried out as described in the above mentioned application.

In connection with general requirements to control the rate of acceleration and deceleration, machine elements working under conditions of widely varying loads are provided with means to uniformly perform this function. This means, designated as "load sensor," is primarily designed to function with the structural elements of this invention. However, these principles described herein are directly applicable to all machine elements, for example, printing machinery web start and stop control, wire drawing machinery, clutch engagement characteristics for various machinery, etc.

FIGS. 14, 15, and 15A illustrate possible embodiments of the load sensor 120. The principles of operation are analogous to the electrical version disclosed in the aforementioned Letters Patent No. 3,338,177, filed Aug. 29, 1967.

In FIG. 14, there is shown a fluid application of load sensing principles embodied in this invention, wherein a cylinder 160 incorporates a piston 162 fitted with a projecting piston rod 164, to which is connected an energy storing spring 166, and is actuated by the introduction of pressurized fluid against one face of the piston. This pressurized fluid is the result of a hydraulic heat generated in a powerpack and piped through suitable hydraulic circuitry. Incorporated into this circuitry is a directional control valve 168 capable of introducing pressurized fluid from the powerpack to the cylinder when the control handle is in the "on" position and to drain unpressurized fluid from the cylinder to the powerpack reservoir when in the "off" position. At the opposite end of the energy storing spring 166 is a pivotal connection means 174 for joining the control crank handle 176 of a fluid pressure or flow control valve 178 and a connecting rod 180 secured to a piston 182 moving within the confines of dashpot cylinder 184. An interconnecting manifold 220 having a pressure or flow restrictor valve 222 is connected to the two chamber areas formed by the movement of the piston 182 in its power or return stroke cycle. A return spring 224 is provided to instantly return the entire assembly to its original starting position.

In operation, pressure generated in the powerpack forces fluid through conduit 180 in a direction to one side of the piston 162 resulting in a quick loading of the energy storing spring 166. Actuation of the main control valve 178 is maintained at uniform acceleration due to the controlled but restrictive nature of the dashpot piston 182 displacing fluid through the manifold 220 and restrictor valve 222. The output of the main control valve 178 feeds a fluid clutch to control the starting acceleration characteristics of components connected therewith. After starting, the normal circuitry takes over. Therefore, the quick loading of the energy storing spring 166 does not directly control the main valve 178 but does provide the energy necessary to power the uniformly accelerating dashpot 184 and control valve assemblies.

The return stroke depends upon the return spring 224 to quickly return the entire assembly to its inoperative position for immediate reuse. The action of the return spring 224 exerts a force resulting in motion of the rod 180 to the left, as in FIG. 14. This motion returns the dashpot piston 182 to its original position by displacing the fluid through the manifold 220 and restrictor valve 222 to a chamber formed on the opposite side of the piston. The restrictor valve 222 is set to "dump" or provide free passage of the fluid during the quick return stroke. The dashpot rod motion, acting through the connection means at the juncture of the energy storing spring and the control valve crank handle 176 causes the rod and piston 162 in the cylinder 160 to move towards its inoperative position. The motion of this piston 162 displaces the fluid in an opposite direction through the drain port of the valve 168 to the powerpack reservoir.

The substitution of the principles of pneumatics may be directly applied to the same structure as described above to achieve the same results.

The embodiment of FIG. 15 operates in much the same way as previously described with respect to FIG. 14, except that in this case the structure is substantially mechanical in nature. A piston rod 180*a* is connected to an energy storing spring 166*a*. Connected to the said dashpot piston rod 180*a* is a lever 232 fulcrumed at F and pivotally connected to link 233 which mechanically controls the starting engagement characteristics of a clutch used for starting purposes. At the terminal end of the energy storing spring 166*a* is a suitable D ring 236 used for manually loading this spring. The return spring 224*a* is used to quickly return the entire assembly for reuse. A limit cable 240 is secured to the D ring 236 and the piston rod 180*a* as at 242.

The operational principles are identical to the above described fluid system.

As may be seen from FIG. 15A, the load sensing unit is electrical and includes a solenoid 250 which has an armature 252 that extends spring 254, which is tensioned between and connected at one end to the armature 252 and at its other end to the arm 256 of a variable resistor 258. This resistor is in the form of a suitable potentiometer which has its arm 256 moving along the resistor so that a variable resistance will be set into the circuit depending upon the sweep of the arm 256. A piston rod 260 extends from the arm 256 to a dashpot 262 which has a check valve seat 264 fitted into the dashpot piston 265 and a valve forming the terminal end of said piston rod 260 for seating against the valve seat during the forward movement of the piston and rod assembly. This provides a seal generating a negative pressure in a chamber formed by the advancing piston resulting in atmospheric pressure acting on the opposite, or exposed face of said piston, thereby providing a predetermined rate of movement of the piston in response to pulling on the piston rod 260 when the arm 256 is turned in a clockwise direction by the spring 254 which was loaded by the actuation of the solenoid armature 252. Following deenergization of solenoid 250, return spring 266 retracts the entire assembly to its original starting position, which allows quick breaking of the vacuum thus equalizing the pressure on both sides of the piston 265. When relay 134 is pulsed to feed clutch circuit 124 (FIG. 13), the value of current to this clutch is uniformly increased from the slip to a full engaged condition. The sweep arm 256 across the variable resistor 258 will automatically find the optimum current value matched to the different drag resistances represented by the load of the differently laden carriers.

The resultant output of the uniform control characteristics of the load sensor is, therefore, used for the purpose of controlling power application rate in starting and similarly for the controlled power rate in an opposite direction for deceleration. In this instance, the power applied performs the function of power or dynamic braking.

It may happen that when a carrier 20 is introduced into the system, it may not be intended for immediate delivery to another station but instead is intended to be stored for a period of time until the articles in the carrier are required. For this purpose, an automatic storage bin arrangement as shown in FIGS. 16–18 may be provided in accordance with the invention.

As may be seen from FIG. 16, assuming that the carriers are moving to the left, as indicated by the arrow, along the rail means 56, diverting rail sections 186 are provided to be displaced by power means as for example solenoids, in response to predetermined automatic actuating structure, between the solid-line non-diverting positions and the dot-dash line diverting positions illustrated in FIG. 16. These diverting rail sections 186 operate in precisely the same way as the diverting rail sections described in the aforementioned patent, and they may be actuated in the same way by solenoid assemblies. When the sliders 26 of a given carrier 20 are positioned so as to indicate according to a given code a particular storage bin, then the solenoid which is connected to one of the diverting rail sections 186 will be automatically actuated to displace the particular rail section to its diverting position with the result that the carrier will slide down one of the inclined chutes 190 shown in FIG. 16, depending upon the particular rail section 186 which has been turned to its diverting position.

The several chutes 190 direct the carriers to conveyors 192 which are storage conveyors in that they carry the carriers 20 to storage bins. As may be seen particularly from FIGS. 17 and 18, a storage bin assembly 204 is arranged between the storage conveyors 192 and the retrieval conveyors 194 which are co-extensive with, equidistant from and arranged at the same elevation as the storage conveyors 192, all these conveyors being in the form of endless belts which are driven in any suitable well known manner. Thus, the arrangement includes parallel or equidistant pairs of storage and retrieval conveyors 192 and 194 with the storage bin assembly 204 arranged therebetween. As is particularly apparent from FIG. 18, the storage bin assembly 204 includes horizontal rows of bins 206 arranged respectively between the pairs of parallel storage and retrieval conveyors which are at the same elevation.

As has been indicated above, the front ends of the carriers carry sliders 26 capable of being positioned so as to designate the destination of the carrier, and these sliders must close a pair of switches simultaneously, this pair of switches being situated along the path of movement of the carrier, in order to automatically actuate the structure which will terminate the movement of the particular carrier 20 when it arrives at its addressed destination. Such pairs of switches were actuated by the sliders 26 in order to close the circuits of the solenoids which displaced the diverting rail sections 186 to their diverting positions to direct the carriers down a particular chute 190. In the same way, the storage bin assembly 204 is provided with shelves 208 extending over the storage conveyors 192 and carrying the pair of switches 196 which are spaced at different distances from each other so as to identify the particular storage bins 206. When a carrier 20 with a pair of sliders 26 positioned with respect to each other as to simultaneously close one of the pairs of switches 196 encounters the latter pair of switches, then the storage conveyor 192 is automatically stopped and the carrier 20 is at this time located beside the bin 206 which is identified by the particular pair of switches 196 so that the carrier 20 becomes automatically situated in front of the storage bin to which it has been addressed. It is to be noted that the situation of the switches 196 and the location shown in FIG. 17, is only indicated schematically. Actually these switches are situated in advance of the particular storage bins to which they belong. The stopping of the movement of the storage conveyor 192 in this automatic manner also serves to automatically set into operation a pusher 198 in the form of an elongated rod extending transversely with respect to the conveyor 192 and longitudinally moved in any suitable way. For example, each rod 198 may be fixed to a piston which slides in a cylinder 200 which is supplied with a fluid under pressure such as air or liquid, although an electrical actuating structure can be used to advance the rod 198 also, if desired. Upon being actuated in the same way that the conveyor 192 has been stopped, the particular pusher 198 which corresponds to the particular bin 206, there being a pusher 198 for each bin 206, is advanced so that a plate 202 at the end of the pusher rod 198 engages the carrier 20 and advances it laterally from the storage conveyor 192 into the bin 206 to which it was addressed, and then the pusher 198 is retracted. In this way, a carrier 20 and all of the articles carried thereby are stored in a particular bin. When the articles in the particular carrier are again required for use, the operator can dial or otherwise automatically actuate the particular pusher 198 so as to advance the particular carrier out of its bin and onto the retrieval conveyor 194 which at this time is automatically set into motion by the same automatic actuating structure which actuates the particular pusher to move a carrier out of a bin. The retrieval conveyor 194 delivers the carrier 20 thereon to an inclined rail assembly 195 having an endless drive 54 for advancing the carrier back up to the rail means 56, and at the upper ends of the rail assemblies 195 are situated diverting rail sections 188 capable of being automatically displaced by the carriers themselves so as to permit ingress of the carriers back onto the path along which the rail means 56 extends, and now the sliders of the particular carrier which has been removed from storage will actuate a pair of switches which identify a particular station to which the carrier will be automatically delivered. These diverting sections 188 have the same structure as the diverting sections described in the above mentioned patent. Thus, the lower rail or wall of each diverting section 188 simply rests on the inclined upper end of the rail 195 which maintains the lower wall, at the proper elevation to form a continuous lower rail portion of the rail means 56, while the upper wall of each diverting rail section 188 simply rests at its free non-pivoted end in overlapping relationship on a succeeding rail portion. In order that these upper walls extend in the same plane as the succeeding and preceding rail upper wall portions, the free ends of the upper walls are formed with beveled or stepped configurations which engage mating configurations of the stationary upper rail portions so that while they overlap, these upper wall portions do not have a position inclined out of the plane of the succeeding and preceding rail sections.

It is, therefore, apparent that the assemblies 195 together with the pivoted rail sections 188 of FIG. 16 function in precisely the same way as ingress means at a station module while the chutes 190 and the diverting rail sections 186 function the same way as an ingress means at a station module of the invention.

In conjunction with the adaptability to dispatch a particular carrier from a storage-retrieval bin or from any other point to a remote station in a system, an assembly of structural components designated as automatic dispatcher, and illustrated in FIG. 19 is described herein. This is to provide means for redirecting a carrier from a remote point to a newly selected station in a system.

A carrier being advanced towards the ingress to a system by the retrieval conveyor 194 is intercepted by the automatic dispatcher 270 as illustrated in FIG. 18, with the resulting alteration of the addressed position of carrier sliders 26 to a new position. The operation of the said carrier dispatcher may occur upon a momentarily stopped carrier.

The automatic carrier dispatcher embodies a reversible motor 300 operatively connected to a drive loop 302 having a yoke structure 304 fixedly attached to said loop and moving to and fro in a plane perpendicular to the longitudinal axis of a carrier 20. The positioning of said yoke in the three principle zones of operation, as "OUT," "NEUTRAL," and "IN" zones, is illustrated in FIG. 19 and is controlled by circuitry illustrated in FIG. 20.

A series of push buttons $310a$–$310d$ located at remote stations activate selected solenoids 312 having armatures 314 adapted to interrupt motion of the yokes, with their captured carrier sliders 26, to a proper position for re-addressing purposes. Each slider has its own yoke actuation circuitry and associated structural components operating independently of each other. However, the capability for operating each yoke assembly at the same time is provided for.

The following describes one yoke operational sequence designated as the "left" slider assembly as viewed from the front of the carrier in FIG. 19, and as distinguished from "right" and left slider assemblies. In operation, a carrier being advanced by the retrieval conveyor 194 trips a normally closed switch connected in series with the conveyor drive assembly (not shown in the circuit drawing, FIG. 20), to stop the carrier at the automatic dispatcher station. Switch 306 is tripped by contact with the carrier. This switch closes the motor circuit and is placed in series with a remote switch 308 to initiate yoke operation when both switches are closed.

Closing this motor circuit results in movement of the left yoke assembly towards the "out" zone, away from the carrier centerline ℄. Yoke 304 having two legs forming depending legs of said yoke structure, and designated as $304a$ and $304b$, is moved to allow leg $304a$ to intercept slider 26, thereby causing both slider 26 and yoke to move to the extreme outer limit of a carrier's side wall section. This action erases any previous address of the carrier by moving the slider to a position in the "OUT" ZONE. At this point in the redirection cycle, a reversal of yoke motion towards the "IN" ZONE, causes yoke surface $304b$ to contact the opposite face of said slider and thereby advance the slider to one of several new positions which had been preselected by activating one of several remotely placed selector buttons $310a$–$310d$. The activation of a particular selector button energizes holding relay $Ca$–$Cd$ which arms the respective solenoid circuit. This armed solenoid circuit is closed simultaneously with the movement of the yoke towards the "IN" ZONE. The solenoid armature is extended into the path of the yoke and upon contact therewith, opens a circuit, thus stopping motion of the yoke and slider in a proper coded position along the scale of identifying indicia.

The yoke is subsequently returned to its original position designated as the "neutral zone" to allow the carrier to be advanced into the system without any interference with the sliders and also to restore the automatic dispatcher to a neutral position for receiving successive carriers.

As may be seen in FIG. 19, the left and right set of indicia and the associated sliders are staggered to allow for the full sweep of the respective yoke assembly movements past the carrier centerline ₵ during the redirection cycle.

Referring now to the block diagram illustrated in FIG. 20, a remote circuit arming switch 308 and a carrier position switch 306 closes a circuit to a hold relay A energizing the motor 300 in a direction to move the yoke 304 towards the "OUT" ZONE. Motion of said yoke continues until the yoke structure simultaneously actuates switches 316 and 318. The function of the switch 316 is to open the relay A motor circuit causing yoke motion to cease and the switch 318 closes the circuit energizing time delay hold relay B. Energization of relay B performs a two-fold function. One reverses the direction of the motor and the other completes the circuit between any one of the active relays Ca–Cd, previously activated by their respective push button circuitry, and the associated solenoid 312a–312d. A selected solenoid armature 314 is extended into the path of the yoke with motion of the yoke maintained until contact of said yoke is made with a normally closed switch 320 fitted on the solenoid armature. At this point, motion of the yoke and slider ceases and the solenoid armature is retracted by actuation of any one of normally closed switches 322a–322d and mounted on the solenoid armature. Simultaneously with the yoke's contact with switch 320, 322, switch 324, which is also mounted on the solenoid armature, is closed to energize hold time delay relay D, which is connected to the motor terminals driving the motor in a direction moving the yoke to its initial position in the "neutral zone." The final determination of the proper position of the yoke in the said neutral zone is made by contact of the yoke structure with cutoff switch 326.

Upon completion of the carrier readdressing cycle, motor drive for conveyor 194 is reactivated to advance the carrier into the system.

In order to divert carriers in and out of a system in a horizontal plane laterally disposed to the normal line of carrier travel, a diverting method as shown in FIGS. 21 and 22 is described as follows.

A framed structure 330 has two principal rail sections, i.e. a straight section 332 located at the lower end of said structure and a curved section 334 located at the upper end thereof. The two principal rail sections are provided to form continuity of curved or straight rails, selectively, by the proper actuation of the framed structure to the extreme limits of its travel in a vertical manner. Motion is imparted by the actuation of solenoid 336.

In operation, a carrier 20 advancing toward the lateral diverting section exists from the advancing means at sprocket 338. The forward momentum of the carrier advances it through the diverting section area.

FIG. 22 illustrates conditions necessary for straight carrier travel.

In this instance, the framed structure 330 is in its extreme up position with the rail section, at the lower end, in a common alignment with the adjacent rail section for straight carrier travel. Downward movement of the framed structure 330 to its extreme downward position aligns the curved rail section 334 to coact with the adjacent rails to provide a curved exit path for the carrier.

Actuation of solenoid 336 is determined by the carrier destination sliders 26 in a matched pattern to the particular diverting station code as previously described.

The same principles of operation, as described for diverting carrier out of a normal straight line travel, is used for carrier entry from a curved to straight line function, as shown in right half side of FIG. 21.

Following carrier travel through the diverting section, continuity of carrier travel is accomplished in the previously described manner.

What is claimed is:

1. The combination, in an automatic load-transporting system, which has hollow rail means having a longitudinally extending opening, said rail means extending along a predetermined path, and having advancing means moving within said rail means; of a load carrier, and a plurality of glide-pawls operatively connected with said load carrier for participating in the guiding thereof and for transmitting advancing movement thereto, each of said glide-pawls including a block, at least one of said glide-pawls coacting with said advancing means and at least one other of said glide-pawls slidably engaging the rail means along which the load-carrier is advanced, said advancing means including a plurality of endless advancing members distributed along said rail means and a plurality of individual drives respectively connected operatively with said endless members for driving the latter, said endless members and drives operatively connected therewith forming a plurality of modular units each of which can be operated independently of the other units.

2. The combination of claim 1 and wherein each block of each glide-pawl has a pair of projections respectively projecting from opposed upper and lower faces of the block and a third projection projecting from an additional face of the block which is directed away from the carrier.

3. The combination of claim 1 and wherein said carrier is of a relatively flat configuration and fixedly carries at least one means by which the load is supported.

4. The combination of claim 1 and wherein each unit of said advancing means includes an elongated belt having an outer face provided with projections between which at least one of said glide-pawls is received so that movement of said belt will be transmitted through the latter glide-pawl to said carrier, and said belt having an inner face which coacts with a rotary driving member.

5. The combination of claim 4 and wherein said belt is formed in sections whose ends are adapted to be joined in a manner defining a continuous loop, said sections each having a reinforcing filament extending longitudinally therethrough and beyond, a separate but dependent splice section having a configuration identical to the parent belt cross section to join together said ends to achieve continuity for belt operation, said splice section having a tubular insert implanted within the matrix of the splice section receptive of the extending ends of adjacent filaments, studs integral with said tubular insert and projecting outwardly from said insert and adapted to be crimped thereby, forcing the insert material into the filament.

6. The combination of claim 1 and wherein said rail means includes elongated hollow channel members each of which carries at its interior a replaceable anti-friction means.

7. The combination of claim 1 and wherein said rail means has straight portions and curved portions interconnecting said straight portions, and said advancing means coacts with said glide-pawls for advancing a carrier along said rail means, said advancing means being discontinuous at selected portions along said rail means.

8. The combination of claim 7 and wherein a drive means coacts with said advancing means for driving the latter, said drive means including at least at some of said selected portions of said rail means power transmission means for transmitting the drive from the end of one portion to the adjoining end of a next succeeding portion.

9. The combination of claim 1 and wherein the carrier is adapted to move along an endless circuit, a dead end station located along said circuit, a lever turnably carried by said carrier for movement between an "on" and an "off" position, a cam at said dead end station situated in the path of movement of said lever for turning the latter automatically from said "off" to said "on" position as the carrier moves past said dead end station during an initial movement of the carrier along said circuit, and a control member situated at said dead end station in advance of said cam to be engaged by the lever when the latter is in its "on" position if the carrier moves a second time past said dead end station and the lever is still in the "on" position.

10. The combination of claim 9, there being a second cam situated at each receiving station in the system for returning the lever of each carrier form its "on" to its "off" position as the carrier arrives at the receiving station.

11. The combination of claim 1 and wherein the carrier is adapted to move along a predetermined circuit, and wherein an ingress means is situated at said circuit for introducing a carrier into the latter, an electrically-actuated lockout clutch means situated at said ingress means for automatically providing for introduction of a carrier into the system only when the carrier which is introduced will not collide with another carrier moving along the system.

12. The combination of claim 1, including a storage and retrieval assembly comprising, at least one storing conveyor for conveying carriers along a given path, at least one retrieval conveyor equidistant from said storing conveyor and substantially coextensive therewith as well as situated at the same elevation as said storing conveyor, a row of bins situated between said conveyors at the same elevation as carriers conveyed thereby, and pusher means for pushing a carrier transversely of said storing conveyor from the latter into a preselected bin to be stored in the latter until the stored carriers is called for whereupon said pusher means displaces said carrier from said bin in which it is stored to said retrieval conveyor to be delivered thereby to an article-transporting system.

13. An assembly as recited in claim 12 and wherein a plurality of storing conveyors are arranged one above the other and an equal number of retriever conveyors are arranged one above the other, and rows of bins are situated between each pair of storing and retrieval conveyors which are situated at the same elevation, said assembly including pusher means for all of said bins.

14. An assembly as recited in claim 13 and wherein each carrier carries an adjustable bin-identifying means settable for identifying a pre-selected bin and said bin-identifying means acting through an electrical circuit on a pusher means which belongs to the bin which is identified by the adjusted position of said bin-identifying means, whereby said carriers will be automatically stored in pre-selected bins.

15. An assembly as recited in claim 12 and wherein a means to address a carrier retrived from a bin and moving on said retrieved conveyor for delivery to a system changes the carrier address upon demand from a control source remotely situated, said means having a sweep or erase mechanism to return the carrier station-identifying means to a neutral position and preselected stops placed in the path of the return stroke of said sweep to properly position the carrier station-identifying means to conform to the desred station address for delivery of said carrier to a preselected station in the system.

16. The combination set forth in claim 1, wherein the advancing means is electrically operated, an electrical circuit in which said advancing means is located, said circuit including a variable resistor having a movable arm which provides a variable resistance according to the position of said arm, a solenoid for initiating the movement of said carrier and having an armature, a spring tensioned between and connected to said arm and armature, and a dash pot connected to said arm for regulating the speed of movement thereof, whereby depending upon the load of said carrier and the articles carried thereby, the solenoid will be capable of advancing said arm to a given position which will provide, through said variable resistor and said electrical circuit on said advancing means, a control which will regulate said advancing means to advance a carrier and articles carried thereby at a controlled acceleration irrespective of the load of the carrier and the articles carried thereby.

17. As assembly as recited in claim 1, having a fluid circuit including a variable flow valve with a movable control arm which provides for a variable flow according to the angular position of said arm, a power pack initiating the movement of said arm, a spring tensioned between and connected to said arm and fluid power cylinder, and a dash pot connected to said arm for regulating the speed of movement thereof, whereby depending upon the load of said carrier and articles carried thereby the power cylinder will be capable of advancing said arm to a given position which will provide, through variable flow to an engaging clutch on said drive means, a control which will regulate said advancing means to advance a carrier and articles carried thereby at a controlled acceleration or deceleration rate irrespective of the load of the carrier and articles carried thereby, and a return spring for restoring the entire structure to its inoperative position.

18. The combination of claim 1 including a means to automatically direct carriers to advance horizontally in a straight or curved path movement, said curved path being in a horizontal plane laterally disposed to the normal line of carrier travel, a diverting means comprising two level rail means configured to follow the geometry of straight rail at one level and curved rail at the other level, said rail means forming part of a frame mounted for vertical travel and powered by an energy device to its respective level to coact with adjoining rail sections for straight or curved carrier travel as determined by the carrier destination sensors.

19. The combination of claim 1 and wherein the rail means coacts with said glide pawls to guide said carrier along a given path, said rail means including at least one vtrtical portion and coacting with said glide-pawls to move, an elongated advancing means extending along said vertical portion and coacting with said glide-pawls to guide the carrier down said vertical portion of said rail means, and a retarding means coacting with said advancing means for driving the latter at a reduced speed, whereby during downward movement of the load carrier along said vertical portion of said rail means, said advancing means will act through said retarding means to retard the downward movement of the carrier along said vertical portion.

20. An automatic load transporting system comprising hollow rail means having a longitudinally extending opening, said rail means extending along a predetermined path in continuous, multi-plane configurations extending in vertical and horizontal attitudes, which path includes a plurality of stations, a plurality of carriers adapted to carry loads which are to be transported, support means operatively connected to each carrier for supporting the latter within said rail means, said support means moving along said rail means during transportation of loads carried by a carrier, advancing means extending at least in part along and confined within said rail means and engaging said support means for advancing the latter together with the carrier to which it is operatively connected along said rail means so as to transport the carriers along said predetermined path, a plurality of ingress means respectively situated at said stations for giving ingress of a carrier to said path at said stations, and means automatically sensing the magnitude of the force required to overcome inertia of a loaded carrier at a controlled uniform rate irrespective of the load of the carrier, said means for automatically sensing said load including a power device having a link which is displaced to load an energy-storing means, connecting means between said link and said energy-storing means, a movable element for varying power values secured to said energy-storing means, and means to controllably retard movement of said movable element until said movable element has moved to match the power value, and means attached to said retarding means for restoring the entire assembly to its initial position, when said power is removed.

21. A system as recited in claim 20, wherein said power device is a fluid powerpack.

22. A system as recited in claim 20, wherein said power device is an electrical unit.

23. The combination as set forth in claim 1, further including a plurality of stations and adjustable station-designating means carried by each carrier and having a plurality of different positions respectively designating said plurality of stations, an automatic dispatcher (270) for redirecting a carrier (20) from a remote point in said system to a newly selected station in said system, said automatic dispatcher comprising means to intercept the carrier for altering its address sliders (26), a reversible motor (300), a drive loop (302) operatively connected to said motor, a yoke structure (304) fixedly attached to said loop for reciprocation therewith in a plane above and perpendicular to the longitudinal axis of a carrier which is being readdressed, said yoke being movable among "OUT," "NEUTRAL," and "IN" zones, a series of electric switches (310a–310d) located at a remote dispatching station, a plurality of solenoids (312) all electrically connected in said dispatching system to respective switches (310a–310d), said switches operable to activate selected solenoids (312), said solenoids having armatures (314) adapted to interrupt the motion of the yokes with their captured carrier sliders (26) properly to reposition them for readdressing purposes.

24. The combination as set forth in claim 1, and wherein said rail means coacts with said glide-pawls to guide said carrier along a given path in continuous multi-plane configurations extending in vertical, horizontal and angular attitudes, with said glide-pawls operatively engaged in said advancing means for transmitting movement thereto, means capable of dissipating the kinetic energy transferred to said advancing means by a carrier when it is descending, or when the $g$ forces attained by said carrier would result in difficulty to stop said carrier, to controllably retard the motion thereof.

References Cited

UNITED STATES PATENTS

| | | | |
|---|---|---|---|
| 2,619,916 | 12/1952 | Rainier | 104—172 |
| 2,635,555 | 4/1953 | Hansson | 104—88 |
| 2,940,400 | 6/1960 | Harrison | 104—88 |
| 2,982,227 | 5/1961 | Bishop et al. | 104—172 XR |
| 3,081,712 | 3/1963 | Schreyer et al. | 104—172 |
| 3,130,685 | 4/1964 | Goodrich et al. | 104—172 |
| 3,156,193 | 11/1964 | Anderson et al. | 104—88 |
| 3,174,438 | 3/1965 | Hariton | 104—172 XR |
| 3,338,177 | 8/1967 | Mirel | 104—88 |
| 3,384,031 | 5/1968 | Dashew et al. | 104—138 |
| 3,403,634 | 10/1968 | Crowder | 104—138 |

ARTHUR L. LA POINT, Primary Examiner

H. BELTRAN, Assistant Examiner

U.S. Cl. X.R.

104—168, 172